United States Patent Office 3,476,058
Patented Nov. 4, 1969

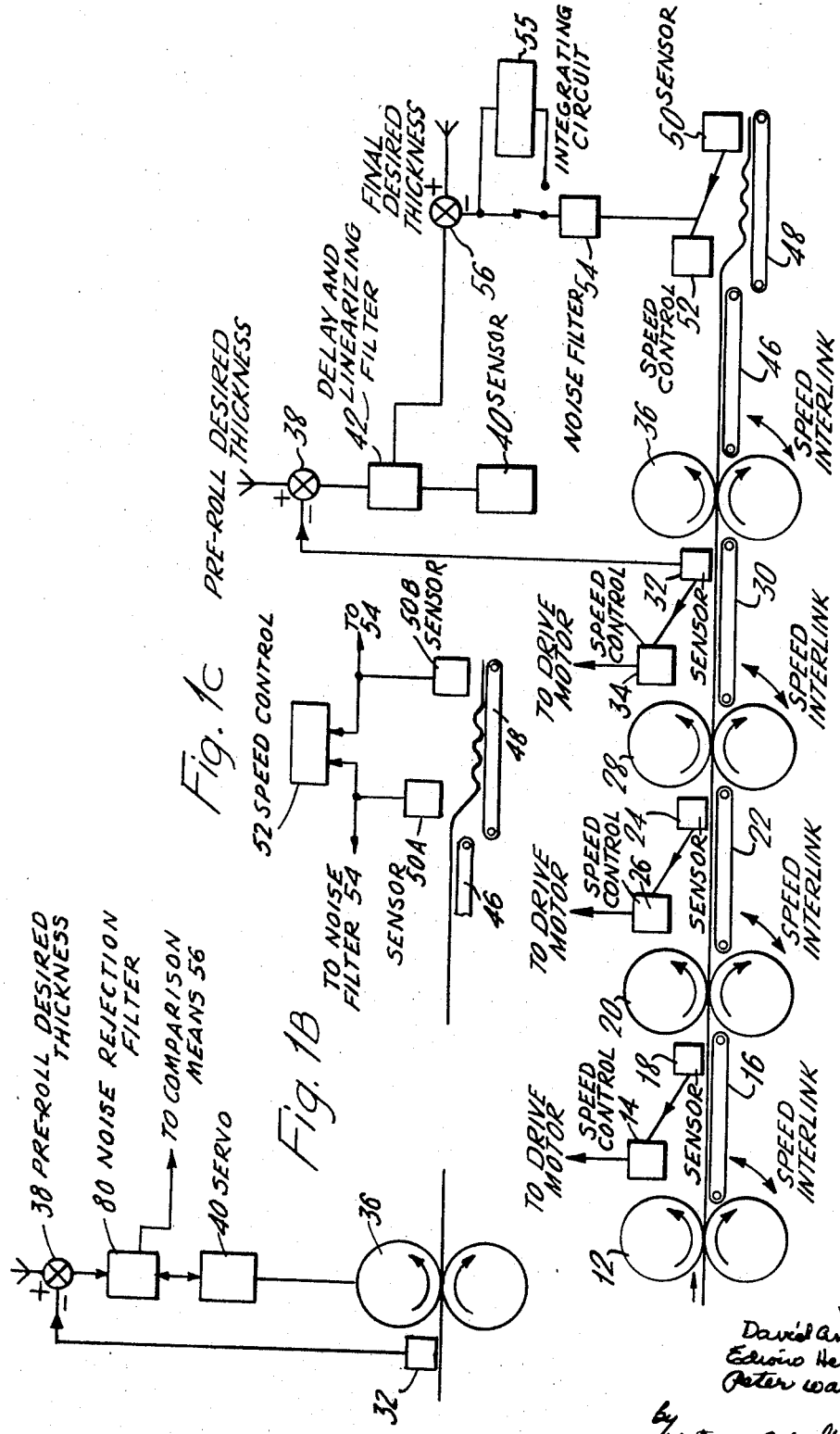

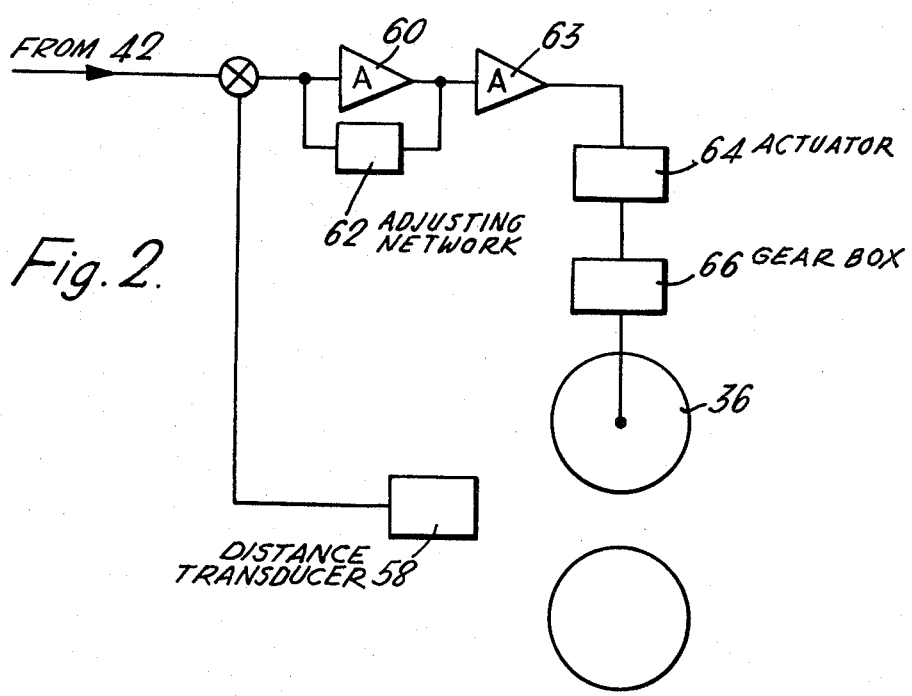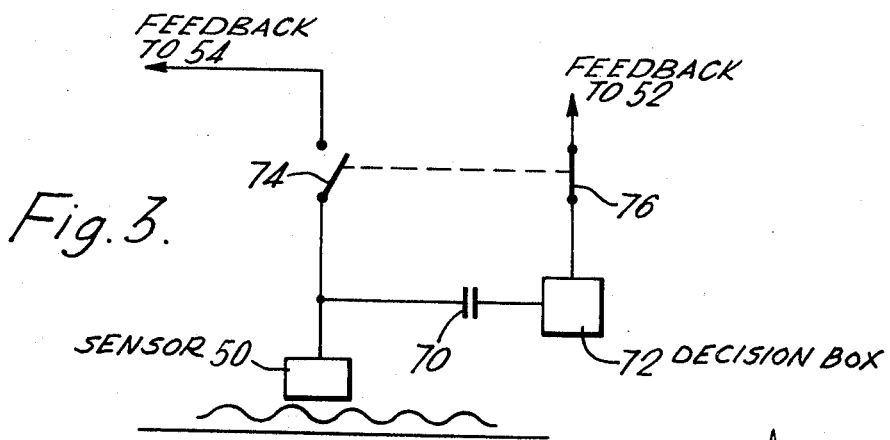

3,476,058
APPARATUS FOR CONTROLLING THE
THICKNESS OF SHEET MATERIAL
David Anthony Watkin and Edwin Henry Noe, Kent, and Peter Wade, Chorleywood, England, assignors to British Scientific Instrument Research, South Hill, Kent, England
Filed Oct. 21, 1966, Ser. No. 588,380
Claims priority, application Great Britain, Oct. 22, 1965, 44,895/65
Int. Cl. A21c 3/02
U.S. Cl. 107—12                10 Claims

ABSTRACT OF THE DISCLOSURE

Apparatus for controlling the thickness of sheet material such as dough includes a pair of pressure rollers movable towards and away from each other and endless conveyors for feeding sheet material between the pressure rollers. A first sensing device is positioned upstream of the rollers for measuring the absolute thickness of the sheet material to control the distance between the pressure rollers and also to control the speed of additional rollers located upstream at the first sensing device in accordance with the thickness sensed. A second sensing device is positioned downstream of the presesure rollers for measuring the absolute thickness of the sheet material after it has passed between the pressure rollers to modify the control of the pressure rollers imposed by the first sensing device.

---

The present invention relates to a device for controlling the thickness of sheet material, more particularly to a device for controlling the thickness of dough or dough-like substances.

Previously proposed devices for producing dough of uniform predetermined thickness consisted of a series of pairs of pressure rollers and means for moving the dough between the pressure rollers, the speed of rotation of the rollers and the distance between two rollers making up a pair being being adjustably manually. It was found that manual adjustment of the rollers by the machine operator could not provide the required degree of accuracy for the dough thickness nor could the adjustments be made sufficiently quickly.

According to the invention there is provided a device for controlling the thickness of sheet material comprising one or more pairs of pressure rollers, means for feeding sheet material between each pair of rollers, means for sesinng the thickness of sheet material and means responsive to said sensing means for controlling the gap between at least one pair of rollers downstream of said sensing means.

In one embodiment of the inevntion the means for feeding the sheet material between the rollers comprises a plurality of endless conveyors, one conveyor being positioned between each pair of rollers and having a speed interlink between the pair of rollers upstream or downstream of the conveyor. Downstream of the last pair of rollers, another endless conveyor may be provided which may have a speed interlink with the last pair of rollers and downstream of the last mentioned conveyor at least one final endless conveyor may be provided together with means for controlling the speed of the penultimate endless conveyor depending on the sensed thickness of the material thereon.

The sensing means may also provide feed back to the rollers positioned upstream thereof. Moreover, further sensing means may be provided for measuring the thickness of material emerging from the device for providing a signal which can be used to modify signals applied to the means for controlling the gap between the rollers. The final endless conveyor is arranged to travel at a slower speed than the preceding conveyor with the result that ripples are formed in the material as it falls thereon. In the preferred embodiment of the invention means are provided for controlling the speed of the penultimate endless conveyor to thereby control the size of the ripples by means of feed back signals derived from the amplitude of the ripples. The rollers may be rotated in the direction shown in FIGURE 1 or in the opposite direction and it is not necessary that all the rollers should rotate in the same direction.

The means for sensing the thickness of the sheet material may consist of any suitable means which will produce a signal for comparison with a standard signal representing the desired thickness. Examples of such sensing means are a light weight, accurately machined roller or shoe which contacts the surface of the sheet, nucleonic absorption means for measurement of the mass of the material per unit area or a suitably positioned light source and photo-electric cell. A preferred sensing means consists of a light shoe made of polytetrafluroethylene which tarils on the material surface. The material below the shoe is arranged to pass over an accurately machined reference surface which is coated with polytetrafluoroethylene to reduce friction. Movement of the shoe is transduced to an electrical signal by, for example a transformer with a movable core which is fixed to the shoe. Comparison of the signal from the sensing means with the standard signal will, except in the case where both signals are the same, produce an error signal which is used to alter the speed or position of the rollers as appropriate in a known manner.

A specific embodiment of the invention will now be described by way of example with reference to the accompanying drawings in which:

FIGURE 1A shows diagrammatically a side view of the device;

FIGURES 1B and 1C illustrate modifications of the device shown in FIGURE 1A;

FIGURE 2 shows a simplified circuit diagram of the servo mechanism for controlling the relative positions of the rollers, and FIGURE 3 is a simplified diagram of the circuits associated with the means sensing the thickness of material on the final endless conveyor.

It will be understood that while the description refers to the controlling of the thickness of dough the device may be used with any sheet material whose thickness can be altered by pressure rollers as shown in FIGURE 1 of the drawings.

As shown in FIGURE 1 of the drawing a sheet of dough 10 is fed by any suitable means between a first pair of pressure rollers 12 which are positioned a fixed distance apart and whose drive motor (not shown) is controlled by speed control means 14. The dough passes between the rollers in the direction indicated by the arrow and onto the endless conveyor 16 which leads the dough to the second pair of rollers 20 also positioned a fixed distance apart. Before the dough passes between the rollers 20 its thickness is measured by sensing means 18 which is coupled to the speed control means 14. The dough is led from the rollers 20 onto another endless conveyor 22 upon which its thickness is measured by sensing means 24 coupled to speed control means 26 for the drive motor of the rollers 20 after which it is passed between rollers 28 positioned a fixed distance apart onto endless conveyor 30 where the thickness of the dough is again measured by sensing means 32 coupled to a speed control means 34 for the drive motor of the rollers 28.

The gap between pairs of rollers 12, 20 and 28 is manually adjustable and is arranged that acceptable thickness reduction ratios are not exceeded by means that are well known to the art and need not be described herein.

In operation, if the desired thickness of dough beneath sensing means 18 is for example 1 inch a signal will be transmitted to the speed control 14 when the thickness or related parameter thereof varies from the desired value by a certain amount, for example ±0.05 inch, to alter the speed of the drive motor by ∓5%. Thus where the thickness of the dough is greater than that desired the speed of the drive motor will be reduced and vice-versa. A similar operation is repeated by rollers 20, sensing means 24, speed control 26 and by rollers 28, sensing means 32 and speed control 34. A typical arrangement is that where the desired thickness at the sensing means 18, 24 and 32 are 1.0 inch, 0.5 inch and 0.25 inch respectively, deviations of the order of ±5% will alter the speed of the respective motor in steps of ∓5%. The sensing means may however be so chosen to provide signals to the speed control means for deviations from the desired thickness gerater or smaller than ∓5%.

The endless conveyors 16, 22 and 30 are arranged so that their speed is substantially the same as the speed of the rollers 12, 20 and 28, respectively, as mentioned previously and therefore a change in the speed of one pair of rollers will cause a corresponding change in the speed of the conveyor immediately downstream thereof.

After leaving the endless belt 30 the dough is fed between a pair of rollers 36 the distance between the rollers 36 being controlled by a servo mechanism 40. From the rollers 36 the dough is led by an endless conveyor 46 to a final endless conveyor 48 on which its thickness is measured by sensing means 50 coupled to a speed control 52 for the drive motor of the endless conveyor 46.

The control of the distance between the two rollers 36 will now be described. Signals from the sensing means 32 are fed to a comparison means 38 where they are compared with signals representing the desired thickness and the derived signals are fed to a cascaded delay circuit and linearizing filter 42. The comparison means 38, delay circuit and linearizing filter 42 are well known in the construction of servo loops and therefore require no further description. The delay circuit which may be a Pade filter or similar circuit provides a delay within a range corresponding to the speed of the endless conveyor 30 and means are provided (not shown) for automatically switching the delay to the correct value. The linearizing filter 42 ensures that the performance of the servo mechanism will be substantially the same regardless of the magnitude of the signals representing the desired thickness. It is preferable to use only the low frequency end of the performance range because of the undesirable noise associated with the high frequency end.

Signals from the linear filter are then fed to the servomechanism 40 in a sense such that an increase in dough thickness sensed by the sensing means 32 causes the distance between rollers 36 to be reduced and a decrease in thickness causes the separation between rollers 36 to be increased. Similarly an increase in dough thickness sensed by the sensing means 50 causes the distance between the rollers to be reduced and a decrease in thickness causes the separation of the rollers to be increased. The amount by which the distance between the rollers 36 may be altered is a function of the diameter of the rollers 36 and of the material being rolled but it is typically in the order of 26% of the measured change in dough sheet thickness at 32. This amount may be pre-set by a suitable gain setting device and/or varied by feedback from the sensing means 50 through filter 54 and comparison means 56 (similar to comparison means 38) if extreme accuracy is required. The feedback would be such as to adjust the gain of the linear filter intermittently. This would ensure the continual updating of the feedforward dynamic model composed of the delay filters and cascaded linear filters. The feedback signal would normally be delayed by a longer period than the dough transit time from the final gauge rolls 36 to the position below measuring means 50.

FIGURE 2 shows in more detail the arrangement of the servomechanism 40. Signals from the cascaded delay circuit and linear filter 42 are compared with signals from distance transducer 58 which measures the distance between the centers or the distance between the peripheries, of rollers 36. The modified signals are fed at the output from the filter to an amplifier 60 which has its operation controlled by the performance adjusting network 62 in accordance with known principles of servo-control theory.

Amplifier signals are then applied to an actuator 64 for a gear-box 66 va a power output stage 63. The apparatus for actually moving or separating upper roller 36 from lower roller 36 is not pertinent to this invention and any means known to the art may be used to accomplish this purpose. For example, each end of the shaft of upper gauge roller 36 may be held in a bearing block which is mounted to a lead screw. The output of gear-box 66 may be arranged to turn the lead screws in the appropriate direction to either raise or lower the bearing block so as to cause an increasing or decreasing separation of the upper and lower gauge rollers 36 from each other. The actuator 64 may be an electric motor or any other suitable mechanical, pneumatic or hydraulic device and controls gear-box 66 to alter the gap between the rollers 36. The actuator may, however, not require a gear-box in order to alter the gap between rollers 36.

As will be seen in FIGURE 1 the dough falls on the final conveyor 48 in such a way that waves or ripples are formed, this being due to the fact that the final conveyor 48 is running at a slower speed than the conveyor 46. These waves or ripples normally subside during passage of the dough along the final conveyor 48 but intermediate conveyors may be provided between the conveyor 46 and the final conveyor 48 to ensure that the ripples have subsided before the thickness of the dough is measured by the sensing means 50. The ripples may cause undesirable noise in the signal from the sensing means 50—hence the provision of the filters 54 to remove the noise. Another way of deriving the sensing signal from the sensing means 50 is to repeatedly take the average of signals representing the measurement for a chosen period, for example 1 minute, and then to compare the average signal with the signal representing the desired thickness. For this purpose an integrating circuit 55 may be coupled between filter 54 and comparison means 56 by switch 57 as shown in FIGURE 1.

In order to control ripples in the dough the D.C. component is stripped from the signal from the sensing means 50 by capacitor 70 and the resulting A.C. signal is fed to decision box 72. If an A.C. signal of more than a tolerable amplitude band is obtained in a frequency range below, for example, 10 c.p.s. then an intermittent signal at intervals of say one minute is applied to the speed control means 52 of the final conveyor drive motor by an output from decision box 72 to control ganged switches 74, 76. This increases the speed of the conveyor in discrete increments of for example 0.5% until the A.C. signal enters a tolerable band. If no A.C. signals are received by the speed control means 52 switch 74 is closed and switch 76 is opened by an output from decision box 72, then the speed of the conveyor 46 or of some intermediate conveyor (not shown) is decreased incrementally.

Switches 74 and 76 in the feedback lines to filter 54 and speed control means 52, respectively, are ganged so that when one switch is open the other is closed and feedback is only applied to one or other of the feedback lines.

By suitable modification of the device it is possible to provide more than one pair of rollers which are controlled by appropriate servomechanisms for altering the distance between them. Similarly the number of pairs of rollers which are a fixed distance apart and which are controllable to run at varying speeds may be suitably chosen to meet the requirements of the material to be processed by the device.

In an alternative arrangement the delay circuit and linear filter 42 may be replaced by a noise rejection filter 80 as shown in FIGURE 1B. The time delay circuit is rendered unnecessary by matching the response time of the servo 40 to the transit time of the dough from below the sensing means to the centre position between the rollers 36. This transit time is typically about 1.2 seconds. With this type of arrangement the sensing means 32 is generally mounted nearer the gap between the rollers 36 than when a delay circuit is used. In practice only approximate time matching is necessary; a tolerance of ±20% is allowable. Thus the response of servo 40 does not need to be altered when the feed speed of dough is altered within these limits.

It will be apparent to those skilled in the art that the speed control of each section consisting of a pair of rollers and speed interlinked conveyor may be arranged such that alteration of the speed of a section proportionately alters the speed of all upstream sections.

Sensing means 50 may be replaced by two sensing means, as shown in FIGURE 1C, sensor means 50A for measuring the amplitude of the ripples and sensor means 50B for measuring the thickness of dough just before it leaves the final endless conveyor where the dough has relaxed.

The rollers 36 are normally arranged to run at a constant speed, the control of dough ripples being obtained by varying the speed of conveyor 46. However, this arrangement means that the speed at which dough is delivered from the device may not be uniform and therefore dough ripples may be controlled by maintaining the speed of conveyor 46 constant and altering the speed of rollers 36.

The rheological characteristics of dough are such that when it is subjected to a stress, it will partly conform to the induced strain, but when the stress is removed it will partly recover in an elastic manner to a thickness somewhere between its original thickness and its thickness under stress. The time taken for it to recover may vary due to external effects such as temperature. Thus, dough which has been subjected to a rolling operation will tend to return towards its pre-rolled thickness with time. If the dough has not recovered to the unstrained state when it is cut, then subsequent recovery will influence the shape of the final product.

This length of dough emerging from the device is a function of its rheological characteristics. This length may be measured after the dough has been baked and if it deviates from a desired length a correction may be applied to vary the set level of ripples in the dough.

What we claim is:

1. A device for controlling the thickness of deformable sheet material, comprising:
    a pair of pressure rollers movable towards and away from each other,
    means for feeding sheet material between said pressure rollers,
    first sensing means being positioned upstream of said pressure rollers for sensing the thickness of the sheet material,
    second sensing means positioned downstream of the pressure rollers for sensing the thickness of the sheet material subsequent to the passage of the sheet material between the pressure rollers,
    means responsive to said first and second sensing means for controlling the separation between the pressure rollers,
    at least one additional pair of rollers positioned upstream of said first sensing means,
    means for feeding sheet material between at least one additional pair of rollers, and
    means responsive to said first sensing means for controlling the speed of said at least one additional pair of rollers to prevent breakages or build up of material.

2. A device according to claim 1, wherein the means for feeding material to said pressure and additional rollers includes a plurality of endless conveyors, each pair of rollers positioned upstream from an endless conveyor, and each endless conveyor and upstream pair of rollers being arranged to run at substantially the same speed.

3. A device according to claim 1, wherein said pair of pressure rollers is positioned downstream of said additional rollers and the second sensing means is positioned at a final endless conveyor located downstream of said pair of pressure rollers, the feeding speed of material between the final endless conveyor and the pair of pressure rollers being controlled to thereby regulate the amplitude of ripples formed in the material deposited on said final endless conveyor.

4. A device according to claim 3 further comprising, means for comparing signals from said sensing means with signals representing the desired thickness of material, third sensing means for measuring the amplitude of ripples in the material on the final endless conveyor, said third sensing means also providing a signal input to the means for comparing.

5. A device according ot claim 4 further comprising switching means controlled by the output from said third sensing means, said switching means having a first position in which the output from said third sensing means is provided to said second sensing means for controlling the speed of material between the final endless conveyor and the pair of pressure rollers, and a second switching position in which the output of said third sensing means is provided to the comparison means.

6. A device for controlling the thickness of deformable sheet material, comprising:
    a pair of pressure rollers movable towards and away from each other,
    means for feeding sheet material between said pressure rollers,
    first sensing means being positioned upstream of said pressure rollers for sensing the thickness of the sheet material,
    second sensing means positioned downstream of the pressure rollers for sensing the thickness of the sheet material subsequent to the passage of the sheet material between the pressure rollers,
    means responsive to said first and second sensing means for controlling the separation between the pressure rollers,
    said means for controlling the separation between said pair of pressure rollers including means for comparing signals from said sensing means with signals representing the desired thickness of material, signal delay means and a linearizing filter through which signals from said comparison means are fed.

7. A device according to claim 6, wherein said signal delay means includes a servo mechanism.

8. A device according to claim 6, wherein said signal delay means includes a delay circuit, the means for controlling the separation between said pair of pressure rollers further including a servo mechanism responsive to signals from said signal delay means and linearizing filter.

9. A device according to claim 6 wherein said means for comparing signals includes a first comparison means for receiving a signal from said first sensing means to be compared with a signal input representing the pre-roll desired thickness of the deformable sheet material and second comparison means for receiving signals from said second sensing means to be compared with a signal representing the final desired thickness of the deformable sheet material.

10. A method of controlling the thickness of a deformable sheet material comprising the steps of,
    feeding the deformable sheet material to a pair of movable pressure rollers, regulating the separation between said pressure rollers by adjusting means, controlling the feeding speed of the sheet material by a signal generated from variations in the thickness of the sheet material, measuring the thickness of the deformable sheet material at an upstream point with respect to said movable pressure rollers to produce a first signal for controlling the feeding, measuring properties of the deformable sheet material at a point downstream of the movable pressure rollers to produce a second signal representative of said properties, and modifying said first signal by means of said second signal to form a resultant signal for controlling the adjusting means to regulate the separation of the rollers to provide a desired thickness of said deformable sheet material.

References Cited

UNITED STATES PATENTS

| | | |
|---|---|---|
| 2,687,052 | 8/1954 | Zeitlin. |
| 2,953,050 | 12/1960 | Doering _____ 107—12 X |
| 1,984,166 | 12/1934 | Walter. |
| 1,989,038 | 1/1935 | Brown. |
| 2,988,641 | 6/1961 | Gough _____ 250—83.6 |

EDWARD L. ROBERTS, Primary Examiner

U.S. Cl. X.R.

18—2; 250—83.3